United States Patent
Uhrich et al.

[15] 3,703,968
[45] Nov. 28, 1972

[54] LINEAR LINKAGE MANIPULATOR ARM

[72] Inventors: Richard W. Uhrich; Jimmy L. Held, both of San Diego, Calif.

[73] Assignee: The United States of America as represented by the Secretary of the Navy

[22] Filed: Sept. 20, 1971

[21] Appl. No.: 181,786

[52] U.S. Cl. ........................... 214/147 T, 214/1 CM
[51] Int. Cl. .................................................. B25j 3/00
[58] Field of Search.214/1 CM, 147 T, 147 G, 147 R

[56] References Cited

UNITED STATES PATENTS 3,262,593   7/1966   Hainer.....................214/1 CM
3,630,389   12/1971   Schmidt...................214/1 CM

*Primary Examiner*—Drayton E. Hoffman
*Assistant Examiner*—George F. Abraham
*Attorney*—Richard S. Sciascia et al.

[57] ABSTRACT

A manipulator arm comprises two parallelogram linkages in combination with a trapezium linkage. The three linkage systems cooperate to produce movement in spherical coordinates when used in conjunction with three independent actuators. The two parallelogram linkages preserve spacial coordination between the wrist, elbow and shoulder joints and the trapezium linkage permits radial extension of objects carried thereby.

8 Claims, 4 Drawing Figures

PATENTED NOV 28 1972　　　3,703,968

*INVENTORS*
RICHARD W. UHRICH
JIMMY L. HELD
BY WILLIAM T. SKEER
*AGENT*
ERVIN F. JOHNSTON
*ATTORNEY*

LINEAR LINKAGE MANIPULATOR ARM

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains generally to the field of mechanical manipulators. More particularly, but not by the way of limitation, this invention pertains to mechanical manipulators used to provide external manipulation of objects from within a deep submergence vehicle. In greater particularity, this invention pertains to a mechanical manipulator which by means of independent actuators provides mechanical movement within a system of polar coordinates.

DESCRIPTION OF THE PRIOR ART

A variety of manipulators are known in the prior art. However, most of these manipulators operate in no origin-ized coordinate system. As a result, all of the controls interact with one another, i.e., movement of one causes displacement of the others. In terrestrial systems where a horizontal always provides a ready reference, such systems are reasonably satisfactory. However, in underwater environments and in zero gravity environments, such systems are difficult to operate because of the control interactions. In such environments, spherical coordinate systems frequently have advantages. In deep submergence applications, the manipulator arms frequently function with artificial illumination. In such environments, an illumination source near the shoulder of the manipulator provides a divergent light beam to sometimes obscure the object with shadow. A fixed coordinate manipulator is particularly desirable in these situations since the controls would not interact and provide dependable relative motion with respect to the obscured object.

Spherical coordinate manipulators of the prior art employ proportional hydraulic flow control to obtain polar coordinate motion with retrolinear devices. Also sensing and computerized position controls have been applied to these devices to effect polar coordinate movement. While suitable for terrestrial applications, the complexity and frailty attributable to such control arrangements are to be avoided in deep submergence vehicles as well as systems designed to operate in outer space. The desirability of a lightweight, dependable system for these hostile environments is so well understood as to require no further explanation.

Although skilled manipulator operators may move conventional manipulators in a polar fashion, to do so requires great skill. In the environments for which this invention has been developed, the operators of the manipulators are frequently personnel chosen for their scientific and engineering abilities and have limited experience as equipment operators. For this reason, a simple, dependable, and rugged manipulator for use in such arduous environments and having non-interacting controls and moving in a recognized coordinate system has been a long felt need in the prior art.

SUMMARY OF THE INVENTION

The device of the invention uses a trapezium linkage having one side thereof extended to provide support for a manipulated implement. The dimensions of the trapezium and the arm extension are carefully chosen so as to provide a linear motion extending radially from one corner of the trapezium. Two parallelogram linkages cooperate with the aforedescribed trapezium linkage to maintain spacial orientation of the supported implement.

Such a linkage system, as will be more clearly shown herein, is able to provide the desired three dimension spherical coordinated movement with three mutually independent hydraulic actuators. Because of the structural and operational simplicity, the device of the invention may be used in deep ocean as well as in outer space environments with a high degree of reliability in an ease of operation hitherto unobtainable.

It is accordingly an object of this invention to provide an improved mechanical manipulator.

A further object of the invention is to provide an improved mechanical manipulator suitable for deep ocean use.

Another object of the invention is to provide a manipulator for use in interplanetary space applications.

A still further object of this invention is to provide a mechanical manipulator with independent spherical coordinate actuation.

Another object of this invention is to provide a manipulator with simple operational control requirements.

Yet another object of this invention is to provide a polar coordinate mechanical manipulator suitable for use in combination with deep submergence ocean vehicles.

Other objects and advantages of this invention will become apparent to persons skilled in the art from a consideration of the following specifications and drawings.

DESCRIPTION OF THE PREFERRED EMBODIMENT

Figure 1:
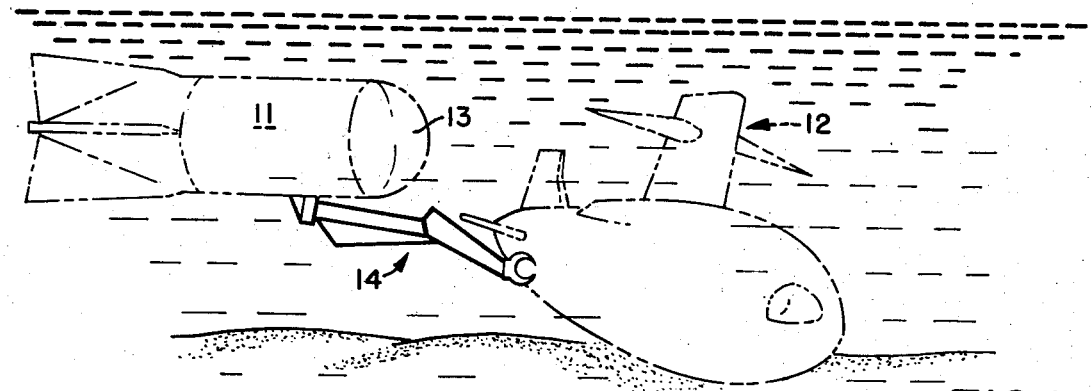
FIG. 1 is a perspective view of the manipulator of the invention in use with a deep submergence vehicle.

Referring to FIG. 1, a deep submergence vehicle 11 is shown approaching an object to be investigated, such as submarine 12, resting on the ocean floor. Deep submergence vehicle 11 has a cylindrical body portion terminated at its forward end by a transparent hemisphere 13. Transparent hemisphere 13 provides a view from the interior of deep submergence vehicle 11 to the area of the ocean floor surrounding the vehicle. On the lower side of deep submergence vehicle 11 and extending outwardly therefrom, a manipulator 14 is attached.

A source of illumination, now shown, is also mounted on deep submergence vehicle 14. The source of illumination may be such as to illuminate the entire field of movement of manipulator 14 or may be steerably moved therewith. Manipulator 14 is shown as being mounted with its shoulder joint, i.e., the innermost joint, on a vertical axis. This orientation permits manipulator 14 to swing in a roughly horizontal arc and raise and lower the positioned implement in an area roughly ahead of and beneath vehicle 11. Of course, other mounting orientations are possible. For example, the axis of the shoulder joint of manipulator 14 may be extended parallel to the axis of deep submergence vehicle 11. Such a configuration may be preferred in working in areas essentially directly beneath deep submergence vehicle 11.

Although a single manipulator 14 is shown, it is considered obvious that a plurality of manipulators may be employed on a single deep submergence vehicle 11, if desired.

Likewise, any suitable implement may be carried by manipulator arm 14. In general applications, a clawlike hand member, such as shown in FIG. 1, is customarily employed. However, if deep submergence vehicle 11 is intended for rescue or other special applications, special implements designed to fit hatches or other expected structure may be carried by manipulator 14.

Figure 2:
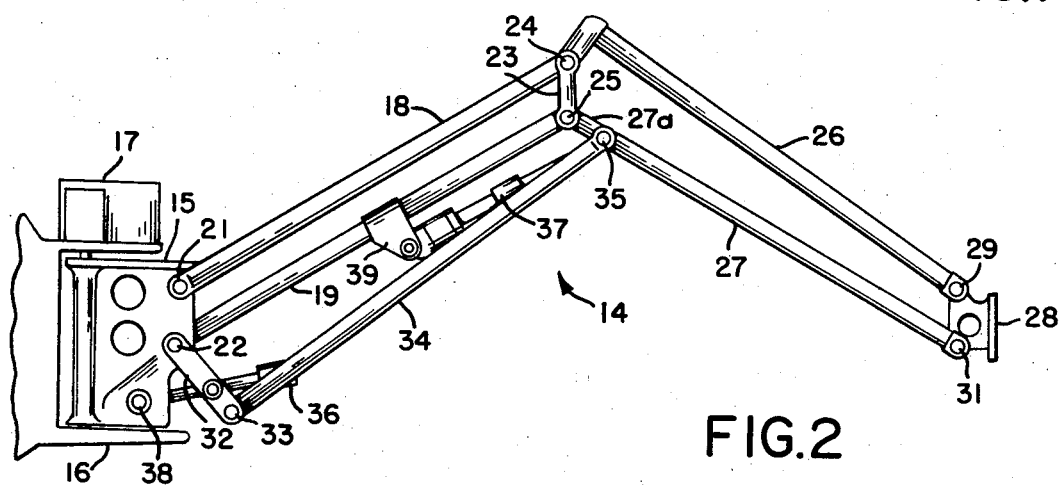
FIG. 2 is a side elevation view of the manipulator of the invention.

Referring now to FIG. 2, manipulator arm 14 of the invention is shown in greater detail. The shoulder joint of arm 14 comprises a support 15 pivoted on an axis extending therethrough. Support 15 is held in a suitable mounting 16. Mounting 16 may be a separate structure, portion of vehicle 11, or any surface about which it is desired to move manipulator arm 14. Support 15 is turned relative to mounting 16 by means of a hydraulic actuator 17. Actuator 17 is of a conventional rotary hydraulic type known in the art. Suitable cylindrical bars 18 and 19 extend outwardly from support 15 and are attached thereto by means of pivot axles 21 and 22. The distal ends of bars 18 and 19 are secured to a suitable link 23. Bars 18 and 19 are joined to link 23 by means of suitable pivot axles 24 and 25. Axles 24 and 25 are maintained in a spatial relationship by link 23. Link 23 is dimensioned such that axles 24 and 25 are spaced from each other the same distance as axles 21 and 22. It follows, therefore, that bars 18, 19, support 15, and link 23 comprise a parallelogram linkage.

Suitably shaped bars 26 and 27 extend outwardly from link 23 and are supported thereon by axles 24 and 25. A suitably shaped wrist support 28 is secured to the distal ends of rods 26 and 27 by means of pivot axles 29 and 31.

Wrist support 28 is configured such that axles 29 and 31 are spaced apart in the same distance as axles 24 and 25. Therefore, arms 26, 27, link 23, and wrist support 28 comprise a second parallelogram linkage. As is well understood in the art, these two parallelogram linkages maintain wrist support 28 and shoulder support 15 in a constant spatial orientation throughout the range of relative movement.

It should be noted that, unlike bars 18, 19 and 27, the bar comprising arm 26 is bent. This bend does not effect the critical parallelogram relationship which is established by axles 24 and 25, 29 and 31. The bend of arm 26 provides mechanical clearance when manipulator arm 14 is contracted.

A suitably shaped link 32 is also mounted on axle 22 from support 15. A pivot axle 33 at the distal end of link 32 provides pivotal connection for arm 34. Arm 34 extends to arm 27 where it is taxed by means of pivot axis axle 35 extending therethrough.

As may be seen, bar 19, link 32, arm 34, and the portion of arm 27 between axles 25 and 35 (labeled 27a in the drawings) form a trapezium linkage.

Wrist supporter 28 may be regarded as being positioned at the end of an extended side of the trapezium linkage. Movement of wrist supporter 28 is constrained by geometric considerations to follow a defined path as the angles of the trapezium are altered. The movement of wrist support 28, although easily visualized, is difficult to described in mathematical terms. Further, since the general situation is of no practical interest, rigorous equations of motion are not given. However, it should be noted that using modern computer techniques a variety of movement trajectories for wrist support 28 may be determined for various combinations of linkage lengths.

Figure 3:
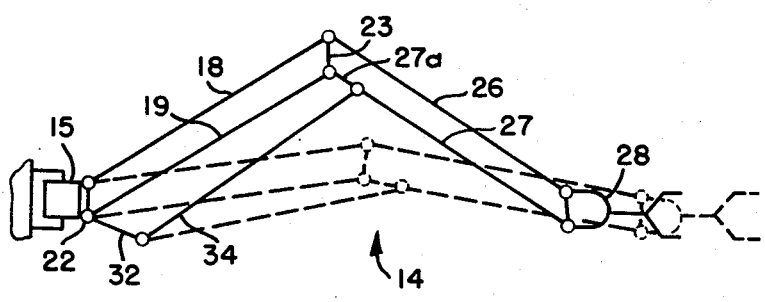
FIG. 3 is a schematic diagram showing the manipulator of the invention in two positions.

The linear form of movement desired in the instant application may be readily visualized with reference to FIG. 3. FIG. 3 shows arm 14 schematically in a partially extended position. The critical supporting linkages which comprise arm 14 are illustrated as single lines. The broken lines of FIG. 3 illustrate the arm in a more nearly extended position.

As may be readily seen in the borken line figure, wrist support 28 has moved radially outward with respect to axle 22, which may be regarded as the origin, without movement of link 32 or shoulder support 15. Similarly, with the configuration shown, arm 14 may be retracted to position wrist support 28 radially inward from the solid line position shown. For purposes of clarity of illustration, the inner position is not illustrated.

Of course, the specific ratio of arm lengths necessary to obtain the illustrated linear motion are quite critical. The approximation of absolute linearity occurs only when the respective arm lengths are dimensioned within narrow limits. Although specific applications may tolerate greater non-linearity at one end of the extension than the other, those chosen for applicants' invention provide a high degree of linearity throughout the travel length of arm 14.

The dimensions to give linearity may be arrived at by a variety of mathematical manipulations. For example, the equations of motion may be set up to give linear placement of arm 38 at three points along the desired radial trajectory and solved for the various arm lengths. The entire equations of motion produced by these arm lengths may then be optimized to provide a minimum deviation.

A satisfactory ratio of arm lengths of applicants' invention are as follows:
arm 27a = 1.0000;
arms 19 and 27 = 10.0000;
arm 32 = 1.9600; and
arm 34 = 10.2440 units.

As an example of the linearity obtainable with these ratios, a manipulator arm having arm lengths of 25 inches for arms 19 and 27 produces departures from linearity of ±0.0625 inches. Of course, departures from these critical ratios, especially for arm 34, does mischief to the linearity at which the radial movement takes place. Within certain limits, e.g., ± 10 percent, these changes of arm lengths are tolerable in certain applications of the invention.

Referring again to FIG. 2, it will be seen that hydraulic actuator 36 and 37 together with the previously described hydraulic actuator 17 provide the desired arm movements. Hydraulic actuator 17 moves support 15 relative to mounting 16 to provide the angle phi ($\phi$) in the polar coordinates. Hydraulic cylinder 36 which is a conventional double acting hydraulic actuator is connected between link 32 and support 15 by means of a pivot axle 38 and provides the movement in the spherical coordinate theta ($\theta$). Actuator 37, like actuator 36, is a conventional double acting hydraulic cylinder and is attached to arm 19 by means of a mounting saddle 39. The operator rod of actuator 37 is attached to arm 27 by means of axle 35. As will be obvious, actuator 37 provides the angular motion in the trapezium linkage to determine the linear extension of wrist support 28 with respect to axle 22 and thereby provides the movement in the r coordinate of the spherical coordinate system.

Figure 4:
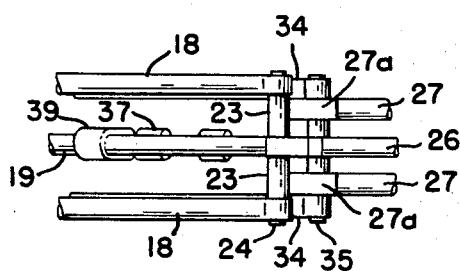
FIG. 4 is a partial plan view of the manipulator of the invention.

It should be noted that although described as a planar linkage system the respective axles extend transversely so that certain rods and arms of the linkage may be doubled. This doubling is shown for purposes of explanation at FIG. 4.

This doubling of operating linkages is required to provide torsional rigidity for arm 14, as will be readily understood. In practice, bars 18, arm 27, and arms 34 together with link 32 are doubled. Bar 19 and arm 26 are used singly.

It will be obvious to those skilled in the manipulator art that the stress concentration in manipulator arm 14 is greatest in the portion of the linkage designated 27a in the drawings. For this reason, arm 27 is made of stainless steel in the developmental models while the remaining arms may be made of lighter material or tubular stock of smaller wall thickness. Other materials, of course, may be used if desired, however the stress concentration along this portion of arm 27 must be borne in mind when determining the operational parameters of the system.

The foregoing description taken together with the appended claims constitute a disclosure such as to enable a person skilled in the marine engineering and mechanical engineering arts and having the benefit of the teachings contained therein to make and use the invention. Further, structure herein described meets the objects of the invention, and generally constitutes a meritorious advance in the art unobvious to such a skilled worker not having the benefit of the teachings contained herein.

Obviously, many modifications and variations of the present invention are possible in the light of the above teachings, and, it is therefore understood that within the scope of the disclosed inventive concept, the invention may be practiced otherwise than specifically described.

What is claimed is:

1. A mechanical manipulator comprising in combination:

pivotally supported mounting means for providing shoulder joint movement for said manipulator:

a first parallelogram linkage pivotally connected to said shoulder mounting means;

a second parallelogram linkage connected to said first parallelogram linkage so as to share a common side therewith:

link means pivotally attached to said shoulder mounting means for providing movable connection therefor; and arm means pivotally attached to the distal end of said link means at one end and pivotally attached to one arm of said second parallelogram linkage at an intermediate point therealong, whereby said arm means, said link means, one arm of said first parallelogram linkage, and a portion of the arm of said second parallelogram linkage to which said arm means is attached form a trapezium linkage.

2. A mechanical manipulator according to claim 1 wherein said link means is pivotally attached to a pivot attachment point of said first parallelogram linkage.

3. A mechanical manipulator according to claim 1 further including actuator means connected between the support and said mounting means for providing operational pivoting force therefor.

4. A mechanical manipulator according to claim 1 further including actuator means connected between said link means and said pivotally supported mounting means for pivotal movement or said link means and arm means carried thereby.

5. A mechanical manipulator according to claim 1 further including:

saddle mounting means attached to the arm of said first parallelogram linkage shared by said trapezium linkage for providing attachment structure thereon, and actuator means connected between said saddle mounting means and the aforesaid intermediate point of the one arm of said second parallelogram linkage for altering the relative angles between sides of the trapezium linkage.

6. A mechanical manipulator according to claim 1 including wrist support means effectively attached to the distal end of said second parallelogram linkage for the support of implements to be positioned by the mechanical manipulator.

7. A mechanical manipulator according to claim 1 in which the ratio of the effective lengths of said recited structural arms and links to the length of the portion of said second parallelogram linkage included in the trapezium linkage is given by the following chart:

| Component | Greater than | Less than |
| --- | --- | --- |
| first parallelogram linkage | 9.0000 | 11.0000 |
| second parallelogram linkage | 9.0000 | 11.0000 |
| link means | 1.764 | 2.156 |
| arm means | 9.2196 | 11.2684 |

8. A mechanical manipulator for moving an object in relation to a fixed surface comprising in combination:

wrist support means attached to said object for movable support thereof;

a first parallelogram linkage pivotally connected to said wrist support means to incorporate said wrist as one side thereof;

a trapezium arm pivotally attached to one member of said parallelogram linkage which is attached to said wrist support at a point one tenth of the way inwardly from the end thereof remote from said wrist support means and having a length 1.0244 times as long as said parallelogram member;

second parallelogram linkage the same size as said first parallelogram linkage attached to said first parallelogram linkage and sharing the side thereof which is opposite said wrist support;

shoulder support means pivotally supporting said second parallelogram linkage for providing angular motion thereof;

link means 0.1960 times as long as the member of said parallelogram linkage to which said trapezium linkage is attached and pivotally attached to said shoulder support at the same point as said second parallelogram linkage is attached and extending therefrom to pivotally connect to the other end of said trapezium arm forming a trapezium linkage comprising said link means, said trapezium arm, a member of said second parallelogram linkage, and the smaller portion of the member of said first parallelogram linkage to which said trapezium arm is attached;

first actuator means connected between said one member of said second parallelogram linkage and the pivotal attachment point where said trapezium arm joins said one member of said first parallelogram linkage for altering the included angles of said trapezium;

second actuator means connected between said link means and said shoulder support means for altering the angular position therebetween; and third actuator means connected between said shoulder support means and the aforesaid fixed surface for altering the angular position therebetween.

* * * * *